United States Patent [19]

Sawai et al.

[11] 4,374,705
[45] Feb. 22, 1983

[54] DISTILLATION FOR ALCOHOL

[75] Inventors: Kiyoshi Sawai, Chibashi; Takao Kawase, Ichiharashi, both of Japan

[73] Assignee: Chisso Engineering Co. Ltd., Tokyo, Japan

[21] Appl. No.: 232,307

[22] Filed: Feb. 6, 1981

[30] Foreign Application Priority Data

Feb. 8, 1980 [JP] Japan .................. 55-14602

[51] Int. Cl.³ .............................. B01D 1/28
[52] U.S. Cl. ...................... 203/19; 203/24; 203/26
[58] Field of Search ............ 203/19, 24, 26, 96, 203/95, 97, 76, 79, 83, 85

[56] References Cited
U.S. PATENT DOCUMENTS 2,509,136  5/1950  Cornell .................. 203/26

4,149,940  4/1979  Pinto .................. 203/96

OTHER PUBLICATIONS

Industrial Engineering and Chemistry, vol. 51 (1959), pp. 249-252.

*Primary Examiner*—Frank Sever
*Attorney, Agent, or Firm*—Thomas E. Beall, Jr.

[57] ABSTRACT

A new distillation equipment for alcohol which consists mainly of a brief concentrating column A, a concentrating column B, a compressor C to compress alcohol vapor generated in column B and water evaporator D heated by the compressed alcohol vapor is developed and this especially fits for a distillation source of a glue like solution obtained by alcohol fermentation because steam generated in the water evaporator D is directly blown into the solution in the concentrating column A.

4 Claims, 2 Drawing Figures

DISTILLATION FOR ALCOHOL

FIELD OF THE INVENTION

This invention relates to an equipment for preparing 94~95% alcohol from a special solution containing alcohol.

A glue-like solution obtained by alcohol fermentation generally contains from 4 to 12 weight % of alcohol as well as plenty of insoluble organic materials and soluble inorganic materials. In order to obtain alcohol from the alcohol containing solution, a brief concentrating column and a concentrating column are employed for preparation of crude alcohol, and an equipment with many columns according to each usages is employed for drinking alcohol.

In such equipments, plenty of steam is necessary as a heat source to obtain 90~95.6 weight % alcohol from such a dilute solution described above. According to "Distillation Engineering Handbook" vol. 3, page 565, an amount of steam necessary to obtain 1 ton of 93~94 weight % alcohol is 3.74 metric tons in the case of crude alcohol, and it is 8.1 metric tons in the case of alcohol product. When converting them to amounts of fuel oil necessary for preparation of steam, their values are 308 l and 667 l respectively, and if alcohol is used for a fuel to generate steam, they correspond 513 Kg and 1112 Kg of 95 weight % alcohol respectively.

Needs for substitute energies are felt keenly as the present situation of crude oil supply is getting more serious, and amongst them, fermented alcohol is one of the noticed energies, since it is made from agricultural products utilizing solar energy as a reproducibly obtained energy. As described above, however, since plenty of energy is consumed for its preparation, its effect upon the energy counterplan is feared to be decreased. Energy saving in the above-mentioned distillation is thus desired earnestly.

DESCRIPTION OF THE PRIOR ART

This invention relates to an alcohol distillation equipment which is accomplished from the results of studies for realizing plenty savings of energy in a distillation procedure in order to respond to the needs. A distillation equipment, particularly a rectification equipment, is generally meant one in which still liquid is heated to its boiling point to generate vapor, and the vapor is then condensed by contacting with liquid falling from the upper part of the column to generate vapors of low boiling components and remove them from the top of the column. Although these vapors at the top of the column having plenty of heat capacity, they are generally utilized only for preheating of raw materials and they are converted to liquids by giving most of their self-contained heat capacities to a cooling water. The temperature of still liquid is, however, higher than that of column top vapor, so that heat capacity of column top vapor cannot be utilized as such for heating of still liquid.

However, by compressing the column top vapor with a compressor, the temperature of the vapor is increased and the condensation temperature of the vapor may be increased higher than the temperature of still liquid, so that there is occurred a possibility to utilize the heat capacity of the column top vapor for heating of still liquid effectively.

The said method which is applied for a rectification of propylene-propane is described in Industrial Engineering Chemistry, Vol. 51 (1959), page 249. In this example, propylene in a column top gas is compressed and utilized for heating and evaporating of propane in still liquid.

On the other hand, there are present two technical problems described below up to now relating to the usage of this technical idea for an equipment in which alcohol is to be distilled from dilute alcohol obtained by fermentation, and thus the idea is not realized hitherto:

(1) In the case of a rectification of propylene-propane, as a temperature difference between a column top and a column bottom being only about 10° C., liquid in the column bottom can be heated by compressing propylene gas slightly. But, in the case of a distillation of alcohol, as a temperature difference between a column top and a column bottom being about 28° C., it is necessary to compress it considerably and thus costs of a compressor and a necessary power for compressing become expensive, which is not economical.

(2) Since still liquid is clear liquid in the case of a rectification of propylene-propane, there is no problem as to the heating by means of a heating pipe. In the case that dilute alcohol obtained by fermentation is distilled, however, still liquid contains plenty of insoluble organic materials and soluble inorganic materials. So, when heating said liquid by means of a heating pipe, not only remaining insoluble organic materials but also soluble inorganic materials may separate on the surface of the heating pipe as scales and thus effective heating cannot be carried out actually.

We inventors reached a conclusion as a result of an investigation of the above-mentioned technical problems. That is, as to (1), the temperature of condensed liquid obtained becomes 118° C. by removing the column top vapor and then compressing the vapor by 3 atm because of the temperature of still liquid being about 105° C. during the distillation of alcohol under the normal pressure, and thus the compressed liquid can be sufficiently used as a heating source. Therefore, it is generally sufficient to compress it by at most 5 atm. In the present state, such an extent of compression may be carried out very easy and economically, and any type of compressor such as a piston type or a rotary type may be used, and in the case of large volume, the rotary type, particularly a turbine type, is preferred.

As to the above-mentioned (2), we reached such a conclusion that scale-adhering problems are solved by the following method, that is the still liquid is not heated by means of a heating pipe, but it is heated by a steam which is obtained by heating desalted water (e.g., a boiler water) as the case using an equipment of the invention, using pressurized still top vapor to generate the steam which has the same temperature, the same pressure or slightly higher temperature as those of the still liquid. The heating method is to blow the steam into the column bottom directly. From these conclusions, the invention is accomplished. A purpose of the invention is to provide an energy saving distillation equipment of alcohol as described above.

SUMMARY OF THE INVENTION

This invention resides in the following distillation apparatus of (1) to (3):

(1) A distillation equipment for alcohol, characterized in that it consists of a brief concentrating column A, a concentrating column B to concentrate alcohol vapor generated in the column A, a compressor C to compress alcohol vapor generated in the column B and a water evaporator D to generate steam by heat exchanging of alcohol vapor compressed in the compressor C, wherein the brief concentrating column A having a raw material introducing pipe 1, a distillation residue discharging pipe 4 and a steam blowing pipe 12, and there being connected or arranged an alcohol vapor pipe 2 and a refluxing liquid pipe 3 between the said column A and the concentrating column B, an alcohol vapor pipe 5 between the concentrating column B and the compressor C, an alcohol vapor pipe 5' between the compressor C and the water evaporator D, a steam blowing pipe 11 between the water evaporator D and the brief concentrating column A, and a steam blowing pipe 13 and an alcohol supplying pipe 7 between the evaporator D and the concentrating column B, as well as an exhaust gas pipe 9 and a water supplying pipe 6 to the water evaporator D, and an alcohol removing branched pipe 8 to the alcohol supplying pipe 7, respectively.

(2) A distillation equipment according to the above mentioned item (1), wherein a heat exchanger E is arranged at a position that the raw material supplying pipe 1 and the distillation residue supplying pipe being crossed.

(3) A distillation equipment according to the above mentioned item (1), wherein a heat exchanger F is arranged at a position that the water supplying pipe 10 to 6 and the alcohol supplying pipe 7 being crossed.

PREFERRED EMBODIMENT OF THE INVENTION

Constitution and effect of the invention are illustrated as follows, with referring to FIG. 1.

Figure 1:
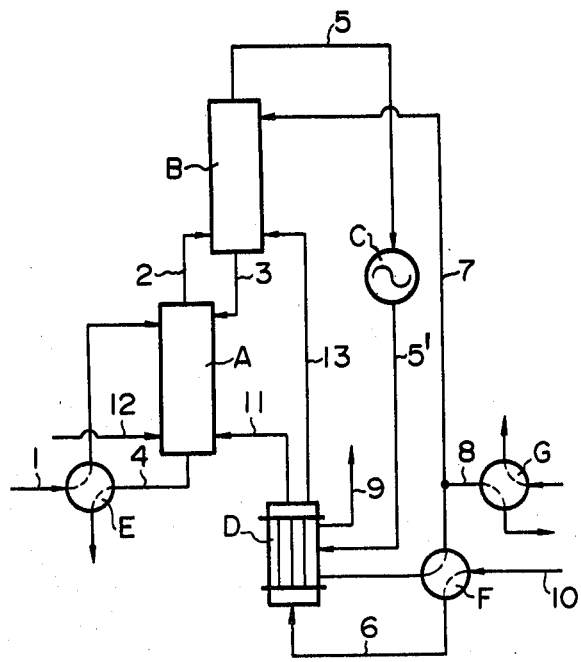
FIG. 1 and FIG. 2 show flow sheets of equipments for preparing alcohol according to the invention and the known method, respectively. In both drawings, each A denotes a brief concentrating column, B denotes a concentrating column, C denotes a compressor, D denotes a water evaporator, E and F denote heat exchangers (not shown in FIG. 2), G denotes a cooler and H denotes a total condenser (not shown in FIG. 1).

Accompanying FIG. 1 is an example of an equipment used in carrying out the invention (flow sheet). That is, fermented liquid containing 6 weight % of alcohol is supplied at 16 metric ton/hr from a pipe 1 via a heat exchanger E, wherein preheated to 80° C., to a brief concentrating column A continuously. Vapor with high content of alcohol generated in the brief concentrating column A is passed via a pipe 2 into a concentrating column B continuously. The concentrating column B is operated at a reflux ratio of 5, and 94.5 weight % of alcohol vapor is generated from the column top via a pipe 5. On the other hand, column top liquid condensed is returned from D via a pipe 7 as a reflux to the concentrating column B, and then falls into the brief concentrating column A via a pipe 3. Columns A and B are both engaged under the normal pressure, and the temperature in the column top of the concentrating column B is 78° C. and that in the column bottom of the brief concentrating column is 105° C.

Column top vapor from the pipe 5 is introduced into a heating part of a water evaporator D by means of a pipe 5', with pressure of it being increased by 3 atm at a compressor C. The compressor C may be a piston type or a centrifugal type, but in the case of large volume; the latter is preferred. The higher the increased pressure is, the smaller the heating area of the water evaporator D becomes, but a necessary power and a cost of equipment may be thereby increased, so pressure increasement of from 3 to 5 atm may be effective and economical. Boiler water which has been preheated with condensed alcohol by a heat exchanger F is supplied from a pipe D via a water supplying pipe 6 to a water evaporator 10, further heated by compressed alcohol from pipe 5' to be converted to steam of 106° C. and 0.3 atm gauge, and blown into the bottom of the brief concentrating column A. On the other hand, alcohol steam is condensed, discharged by a pipe 7 to preheat the boiler water by means of the heat exchanger F. Thereafter, a part of liquid, 5 metric ton/hr, is returned to B as reflux by means of the pipe 7 continuously and the other part is conveyed by a branched pipe 8, further cooled by a cooler G, and thereafter removed at 1 metric ton/hr as a product (94.5 weight %).

In such a case that non-condensed gas in alcohol vapor or low boiling components such as aldehyde or methanol etc. introduced from 5 may remain in the heating part of the water evaporator D, they may be removed by a discharge pipe 9 at any appropriate time.

To the bottom of the brief concentrating column A, in addition to the above-mentioned steam from pipe 11, assistant steam generated externally is blown from a pipe 12. Still liquid (0.08 weight % of alcohol content) is removed at 18.4 metric ton/hr by a pipe 4 from the bottom of the brief concentrating column A, and discharged via a heat exchanger E out of system.

Figure 2:
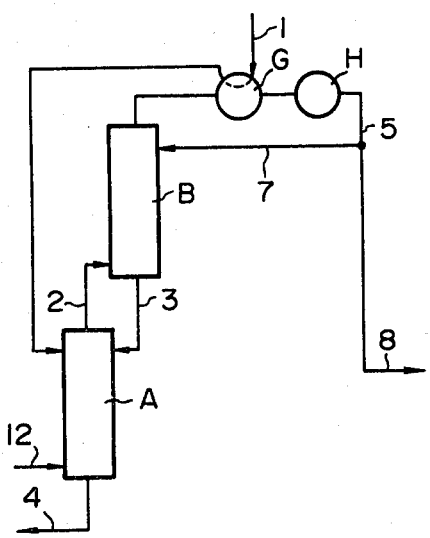

Energy necessary to prepare 1 metric ton of alcohol (94.5 weight %) with the above-mentioned equipment and by the above-mentioned operation method is as follows: 1.033 metric tons of external steam from the pipe 12 and 224 KWH of power. When calculating fuel oil amount necessary to generate said steam and electric power using the following equations; 1 KWH=0.24 l of oil and 1 metric ton of steam=82.4 l of oil, energy consumption may be corresponded to totally 139 l of oil for preparing 1 metric ton of alcohol, including steam and electric power. On the other hand, the known distillation equipment of alcohol is shown in FIG. 2. In the FIG. 2, the same reference numbers and letters of units and pipings have the same meanings as the FIG. 1, so the explanations of these may be omitted. Necessary steam amount is 3,353 Kg per 1 metric ton of products, which corresponds to 276 l of fuel oil, when the operation is carried out with the known equipment under the same conditions (preheating feed liquid to 80° C., reflux ratio of 5, and product purity of 94.5 weight %) as the above-mentioned ones. That is, necessary energy amount may be indeed reduced by half by using the equipment of the invention compared with the case of the known equipment. By increasing the efficiency of the heat exchanger E and by preheating the raw material to 90° C., the necessary energy for the equipment of the invention may be 114 l of fuel oil in the term of oil amount. Therefore, in the case that the equipment of the invention being employed appropriately, an energy saving effect may be more eminently compared with the known method; in which the necessary energy is 252 l of fuel oil in the term of oil amount.

A part of steam generated from the water evaporator D may also be supplied via a pipe 13 to the lower part of the concentrating column B to control the distillation effect, in the invention. The equipment of the invention, of course, may be employed advantageously for any aqueous alcohol solution which does not contain plenty of organic materials and soluble inorganic materials.

What is claimed is:

1. A process for the distillation of alcohol from a glue-like raw alcohol containing solution which comprises:

providing a distillation equipment comprising:

first concentrating column means to generate alcohol vapor from glue-like raw alcohol containing liquid;

second concentrating column means to concentrate alcohol vapor generated in the first concentrating column means;

compressor means to compress the alcohol vapor generated in the second concentrating column means to a vapor having a temperature of about 118° C. and a pressure of 3–5 atm/G.;

water evaporator means to generate steam having a temperature of about 106° C. and a pressure of 0.3 atm/G. by heat exchanging of water with the alcohol vapor compressed in the compressor means;

said first concentrating column means having a raw alcohol containing liquid introducing pipe, a distillation residue discharging pipe and a steam inlet pipe;

an alcohol vapor conducting pipe and a refluxing liquid conducting pipe each being operatively connected between said first concentrating column means and said second concentrating column means;

an alcohol vapor conducting pipe operatively connected between the second concentrating column means and the compressor means;

a compressed alcohol vapor conducting pipe operatively connected between the compressor means and the water evaporator means;

a steam blowing pipe operatively connected between the water evaporator means and the first concentrating column means;

a steam blowing pipe and an alcohol supplying reflux pipe each operatively connected between the evaporator means and the second concentrating column means;

an exhaust gas pipe and a water supplying pipe each operatively connected to the water evaporator means; and an alcohol removing branched pipe operatively connected to the alcohol supplying pipe;

feeding the glue-like raw alcohol containing solution to said first concentrating column means; and recovering 94.5 weight % of alcohol through said alcohol removing branched pipe.

2. A distillation process according to claim 1, wherein the distillation equipment includes heat exchange means providing heat exchange between said glue-like raw alcohol containing liquid introducing pipe and said distillation residue discharging pipe.

3. A distillation process according to claim 2, wherein the distillation equipment includes heat exchanger means providing heat exchange between said water supplying pipe and said alcohol supplying pipe.

4. A distillation process according to claim 1, wherein the distillation equipment includes heat exchanger means providing heat exchange between said water supplying pipe and said alcohol supplying pipe.

* * * * *